United States Patent
Guillaume

(10) Patent No.: US 10,057,056 B2
(45) Date of Patent: Aug. 21, 2018

(54) METHOD AND DEVICE FOR GENERATING A SECRET CRYPTOGRAPHIC KEY, WHICH IS COMMON TO A FIRST NODE AND A SECOND NODE, WITH THE AID OF AT LEAST ONE HELPER NODE

(71) Applicant: Robert Bosch GmbH, Stuttgart (DE)

(72) Inventor: Rene Guillaume, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 237 days.

(21) Appl. No.: 15/135,118

(22) Filed: Apr. 21, 2016

(65) Prior Publication Data

US 2016/0323101 A1 Nov. 3, 2016

(30) Foreign Application Priority Data

Apr. 28, 2015 (DE) .......................... 10 2015 207 763

(51) Int. Cl.
*H04L 9/08* (2006.01)
*H04W 12/04* (2009.01)
*H04K 1/00* (2006.01)

(52) U.S. Cl.
CPC ............. *H04L 9/0838* (2013.01); *H04K 1/00* (2013.01); *H04L 9/0875* (2013.01); *H04W 12/04* (2013.01)

(58) Field of Classification Search
CPC ....... H04L 9/0838; H04L 9/0875; H04L 9/08; H04L 12/28; H04K 1/00; H04W 12/04; H04W 48/20; G08C 17/00

USPC .... 380/46, 247, 249, 262, 44; 370/254, 400; 713/171
See application file for complete search history.

(56) References Cited

U.S. PATENT DOCUMENTS

| | | | |
|---|---|---|---|
| 9,819,488 B2* | 11/2017 | Gungor | ................. H04L 9/0872 |
| 2010/0074157 A1* | 3/2010 | Doh | ...................... H04W 84/18 |
| | | | 370/311 |
| 2015/0295708 A1* | 10/2015 | Howe | .................. H04L 9/0858 |
| | | | 380/28 |

FOREIGN PATENT DOCUMENTS

DE 102012215326 3/2014

* cited by examiner

*Primary Examiner* — Thanhnga B Truong
(74) *Attorney, Agent, or Firm* — Norton Rose Fulbright US LLP; Gerard Messina

(57) ABSTRACT

A method for generating a secret cryptographic key, which is common to a first node and a second node, with the aid of at least one helper node. The first node wirelessly transmits a first random sequence, the second node receives the first random sequence via a generally static reciprocal first communication channel, the second node receives a first signal, which is a function of the first random sequence, with the aid of the helper node, the second node derives the key from the first signal using the first random sequence, the second node wirelessly transmits a second random sequence, the first node receives the second random sequence, the first node receives a second signal, which is a function of the second random sequence, with the aid of the helper node, and derives the key from the second signal with the aid of the second random sequence.

21 Claims, 1 Drawing Sheet

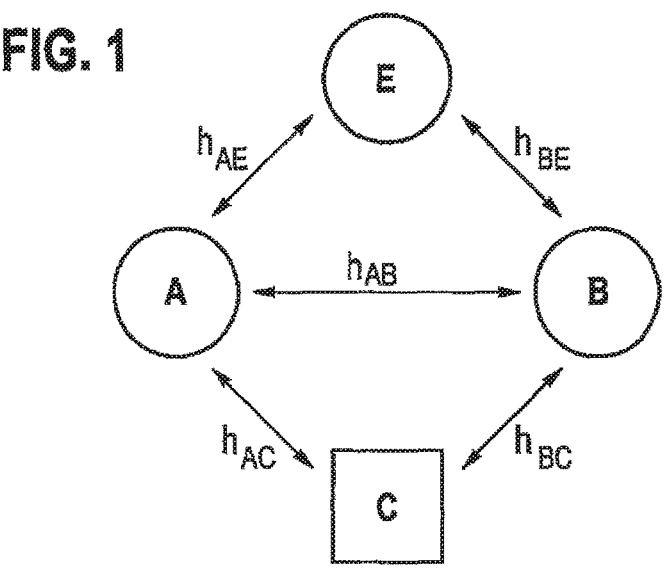
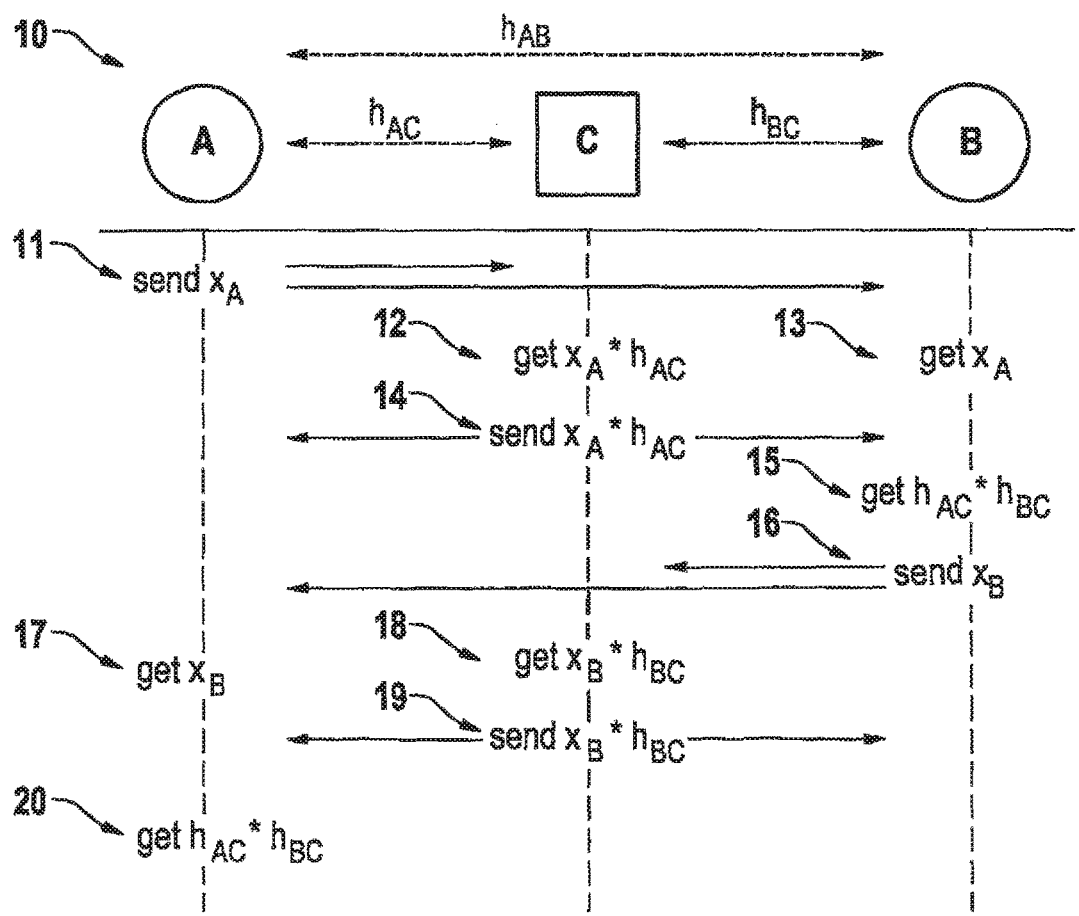

METHOD AND DEVICE FOR GENERATING A SECRET CRYPTOGRAPHIC KEY, WHICH IS COMMON TO A FIRST NODE AND A SECOND NODE, WITH THE AID OF AT LEAST ONE HELPER NODE

CROSS REFERENCE

The present application claims the benefit under 35 U.S.C. § 119 of German Patent Application No. DE 102015207763.2 filed on Apr. 28, 2015 which is expressly incorporated herein by reference in its entirety.

FIELD

The present invention relates to a method for generating a secret cryptographic key, which is common to a first node and a second node, with the aid of at least one helper node. The present invention additionally relates to a corresponding device, a corresponding computer program, and a corresponding storage medium.

BACKGROUND INFORMATION

The fundamental principle of generating symmetric cryptographic keys based on physical properties of the communication channel is described in literature. The use in principle of a helper node (trusted device, helper device) is also available in cryptography and was proposed in literature for channel-based key generation, for example, to incorporate the physical properties of further channels into the key generation or to increase the range of the system.

German Patent Application No. DE 10 2012 215 326 A1 describes a method for generating a cryptographic key in a network including a first network element, a second network element, and a network node, the first network element being able to communicate via a first transmission channel and the second network element being able to communicate via a second transmission channel with the network node. The method includes, on the part of the first network element, a step of determining a first item of channel information with respect to the first transmission channel based on a first pilot signal, which is emitted by the network node, and a step of ascertaining the symmetric cryptographic key using the first item of channel information and an item of information about a combined item of channel information, the combined item of channel information representing a combination, which is determined on the part of the network node based on a second pilot signal transmitted from the first network element to the network node and a third pilot signal transmitted from the second network element to the network node, of transmission characteristics of the first and the second transmission channels.

SUMMARY

The present invention provides an example method for generating a secret cryptographic key, which is common to a first node and a second node, with the aid of at least one helper node, a corresponding device, a corresponding computer program, and a corresponding storage medium according to the independent claims.

One advantage of this approach is the achieved generation of symmetric, cryptographic keys based on physical properties of the communication channel. A high level of security is achieved in that the cryptographic key is largely undefined, i.e., the observed variations are subject to a high level of randomness. In addition, no special hardware such as additional antennas is required in comparison to other methods.

According to the present invention, it may be provided that the helper node receives pilot signals via a time-variant second communication channel and via a time-variant third communication channel and relays the first random sequence and the second random sequence. The dynamics in the surroundings of the first and second node are skillfully used in this way to promote the above-described randomness. Since the trustworthiness (trusted device) of such an additional, assisting device—for example, a relay node—cannot always be guaranteed or assumed, it is advantageous to leave the helper node unaware of the generated cryptographic key. By using the provided protocol and corresponding signal processing, the advantages of a helper node may be used, without having to inform it about the generated key. One example distinctive feature of the method is that the helper node required for this purpose does not obtain any knowledge about the generated key material. The method is scalable and may be expanded for further helper nodes.

According to another aspect, it may be provided that the first node and the second node are stationary and the helper node is a mobile terminal, in particular a smart phone. Generating sufficiently secure cryptographic keys is therefore also enabled when the participating nodes are located in static surroundings or may not move themselves to generate the required dynamics.

BRIEF DESCRIPTION OF THE DRAWINGS

Exemplary embodiments of the present invention are shown in the figures and are explained in greater detail below.

FIG. 1 shows the system model underlying one specific embodiment.

FIG. 2 shows a protocol for generating symmetric keys with the aid of a helper node according to one specific embodiment.

DETAILED DESCRIPTION OF EXAMPLE EMBODIMENTS

In accordance with an example embodiment of the present invention, a setup according to FIG. 1 is assumed. Two legitimate nodes A and B, for example, sensors installed in a wall, wish to generate a symmetric key based on properties of wireless channel $h_{AB}$. Since wireless communication channels are theoretically reciprocal, it is assumed here that $h_{AB}=h_{BA}$. An attacker E observes the key generation process and attempts to extract the same key as nodes A and B. Depending on the scenario, it is possible that channel $h_{AB}$ is static and is therefore predictable. This may originate both from a lack of dynamics in the surroundings and also a lack of mobility of nodes A and B. A helper node C is therefore consulted. This may be, for example, a base station or a mobile terminal of the user, such as a smart phone. It is assumed that channels $h_{AC}$ and $h_{BC}$ have sufficient dynamics to be able to generate a secure key. This may also be achieved in that node C is moved by the user.

Under these assumptions, example method 10 functions as follows with reference to FIG. 2:

Node A transmits a random sequence $x_A(t)$ to node B (reference numeral 11). Node B receives the following signal (reference numeral 13), the operator "*" representing a fold in the time range and $n_{AB}(t)$ representing additive noise:

$$r_{AB}(t)=X_A(t)*h_{AB}+n_{AB}(t)$$

Because $h_{AB}$ is static, node B may easily estimate random sequence $x'_A(t)$. This is possible, for example, in that node B has already estimated channel $h_{AB}$ in a previous communication step and it has changed hardly or only negligibly over time because of the assumed static nature. A channel estimation may be based on standard methods, which are familiar to those skilled in the art in the field of scientific systems engineering technology or signal analysis.

Helper node C in turn receives the following signal (reference numeral 12):

$$r_{AC}(t)=x_A(t)*h_{AC}+n_{AC}(t)$$

Channel $h_{AC}$ is assumed to be time-variant, so that helper node C could at best estimate a strongly corrupted random sequence.

Helper node C now relays received signal $r_{AC}(t)$ (reference numeral 14). Node B receives the following signal (reference numeral 15):

$$r_{CB}(t)=r_{AC}(t)*h_{BC}(t)+n_{CB}(t)$$

If $r_{CB}(t)$ is transformed into the frequency range, the following relationship thus results:

$$R_{CB}(f)=R_{AC}(f)H_{BC}(f)+N_{CB}(f)=X_A(f)H_{AC}(f)H_{BC}(f)+N'_{CB}(t)$$

Since node B has already estimated random sequence $X'_A(f)$, node B may therefore now estimate entire channel $K_{AB}(f)=H_{AC}(f)H_{BC}(f)$, which may be used as key material.

The described method steps are finally repeated with reversed roles of nodes A and B. Node B starts by transmitting a random sequence $x_B(t)$ (reference numeral 16). The further steps (reference numerals 17 through 20) are carried out similarly. If entire method 10 is completed within coherence time of channels $h_{AB}$, $h_{AC}$, and $h_{BC}$, nodes A and B possess the following shared secret, which may be used in particular as a shared key:

$$K_{AB} \approx K_{BA}$$

The shared secret of nodes A and B is thus generally based on communication channels $h_{AC}$ and $h_{BC}$ from helper node C, which possess sufficient dynamics due to movement of helper node C, for example.

Helper node C does not receive any knowledge about these channels, however, since helper node C does not know random sequences $x_A$ and $x_B$ and therefore cannot estimate the channels sufficiently accurately. This is also true of attacker E shown in FIG. 1, since it may generally only examine channels $h_{AE}$ and $h_{BE}$, which are generally independent of $h_{AC}$ and $h_{BC}$. If these are also static, like $h_{AB}$, attacker E may estimate random sequences $x_A$ and $x_B$, but he does not thus obtain any knowledge of $h_{AC}$ and $h_{BC}$ and therefore no knowledge about generated key $K_{AB} \approx K_{BA}$.

This method may be implemented, for example, in software or hardware or in a mixed form of software and hardware, for example, in an intelligent home (smart home). The following application (use case) is to be considered: Two permanently installed sensor nodes A, B—for example, smoke alarms—have a static channel and use, as the shared random source, their wireless channels for a movable smart phone C, which is used as the relay station during the key generation.

What is claimed is:

1. A method for generating a secret cryptographic key, which is common to a first node and a second node of a network, with the aid of at least one helper node of the network, the method comprising:
   wirelessly transmitting, by a transmitter of the first node, a first random sequence;
   receiving, by a receiver of the second node, the first random sequence via a static reciprocal first communication channel;
   receiving, by the receiver of the second node, a first signal, which is a function of the first random sequence, with the aid of the helper node;
   deriving, by a processor of the second node, the key from the first signal with the aid of the first random sequence;
   wirelessly transmitting, by a transmitter of the second node, a second random sequence;
   receiving, by the receiver of the first node, the second random sequence via the first communication channel;
   receiving, by the receiver of the first node a second signal, which is a function of the second random sequence, with the aid of the helper node;
   deriving, by a processor of the first node, the key from the second signal with the aid of the second random sequence;
   receiving, by a receiver of the helper node, the first random sequence via a time-variant second communication channel and the second random sequence via a time-variant third communication channel; and
   relaying, by a relay of the helper node, the first random sequence and the second random sequence;
   wherein the helper node does not require knowledge of the key.

2. The method as recited in claim 1, further comprising:
   estimating, by the second node, a channel property of the first communication channel; and
   estimating, by the second node, the received first random sequence on the basis of the channel property.

3. The method as recited in claim 2, wherein the channel property is a transmission function of the first communication channel.

4. The method as recited in claim 3, wherein the method is completed within a coherence time of the first communication channel, the second communication channel, and the third communication channel.

5. The method as recited in claim 4, wherein the first node and the second node are stationary and the helper node is a mobile terminal.

6. The method as recited in claim 5, wherein the mobile terminal is a smart phone.

7. The method as recited in claim 5, wherein the first node and the second node include sensors.

8. A non-transitory machine-readable storage medium storing a computer program, which is executable by a processor, comprising:
   a program code arrangement having program code for generating a secret cryptographic key, which is common to a first node and a second node, with the aid of at least one helper node, by performing the following:
      wirelessly transmitting, by a transmitter of the first node, a first random sequence;
      receiving, by a receiver of the second node, the first random sequence via a static reciprocal first communication channel;
      receiving, by the receiver of the second node, a first signal, which is a function of the first random sequence, with the aid of the helper node;

deriving, by a processor of the second node, the key from the first signal with the aid of the first random sequence;

wirelessly transmitting, by a transmitter of the second node, a second random sequence;

receiving, by the receiver of the first node, the second random sequence via the first communication channel;

receiving, by the receiver of the first node a second signal, which is a function of the second random sequence, with the aid of the helper node;

deriving, by a processor of the first node, the key from the second signal with the aid of the second random sequence;

receiving, by a receiver of the helper node, the first random sequence via a time-variant second communication channel and the second random sequence via a time-variant third communication channel; and relaying, by a relay of the helper node, the first random sequence and the second random sequence;

wherein the helper node does not require knowledge of the key.

9. A system, which is configured to generate a secret cryptographic key, which is common to a first node and a second node of a network with the aid of at least one helper node of the network, comprising:

a transmitter of the first node to wirelessly transmitting a first random sequence;

a receiver of the second node to receive the first random sequence via a static reciprocal first communication channel, and to receive a first signal, which is a function of the first random sequence, with the aid of the helper node;

a processor of the second node to derive the key from the first signal with the aid of the first random sequence;

a transmitter of the second node to transmitting a second random sequence;

a receiver of the first node to receive the second random sequence via the first communication channel, and to receive a second signal, which is a function of the second random sequence, with the aid of the helper node;

a processor of the first node to derive the key from the second signal with the aid of the second random sequence;

a receiver of the helper node to receive the first random sequence via a time-variant second communication channel and the second random sequence via a time-variant third communication channel; and a relay of the helper node to relay the first random sequence and the second random sequence;

wherein the helper node does not require knowledge of the key.

10. The system as recited in claim 9, further comprising:

estimating, by the second node, a channel property of the first communication channel; and estimating, by the second node, the received first random sequence on the basis of the channel property.

11. The system as recited in claim 10, wherein the channel property is a transmission function of the first communication channel.

12. The system as recited in claim 11, wherein the method is completed within a coherence time of the first communication channel, the second communication channel, and the third communication channel.

13. The system as recited in claim 12, wherein the first node and the second node are stationary and the helper node is a mobile terminal.

14. The system as recited in claim 13, wherein the mobile terminal is a smart phone.

15. The system as recited in claim 13, wherein the first node and the second node include sensors.

16. The storage medium as recited in claim 8, further comprising:

estimating, by the second node, a channel property of the first communication channel; and estimating, by the second node, the received first random sequence on the basis of the channel property.

17. The storage medium as recited in claim 16, wherein the channel property is a transmission function of the first communication channel.

18. The storage medium as recited in claim 17, wherein the method is completed within a coherence time of the first communication channel, the second communication channel, and the third communication channel.

19. The storage medium as recited in claim 18, wherein the first node and the second node are stationary and the helper node is a mobile terminal.

20. The storage medium as recited in claim 19, wherein the mobile terminal is a smart phone.

21. The storage medium as recited in claim 19, wherein the first node and the second node include sensors.

* * * * *